United States Patent

Leahy

[11] 4,022,487
[45] May 10, 1977

[54] BICYCLE FAIRING AND BRACKET THEREFOR

[76] Inventor: William F. Leahy, 624 Edwards, West Dundee, Ill. 60118

[22] Filed: Apr. 26, 1976

[21] Appl. No.: 679,989

[52] U.S. Cl. .............................. 280/289 S; 296/78.1
[51] Int. Cl.² ........................................... B62J 17/04
[58] Field of Search ................. 280/289 S; 296/78.1

[56] References Cited

UNITED STATES PATENTS

| | | | |
|---|---|---|---|
| 3,154,342 | 10/1964 | Mueller | 296/78.1 |
| 3,801,152 | 4/1974 | Tims | 296/78.1 |
| 3,866,971 | 2/1975 | Hugon | 296/78.1 |
| 3,904,238 | 9/1975 | Anderson | 280/289 S X |

FOREIGN PATENTS OR APPLICATIONS

| | | | |
|---|---|---|---|
| 208,276 | 1/1940 | Switzerland | 296/78.1 |
| 807,507 | 1/1959 | United Kingdom | 296/78.1 |

Primary Examiner—Joseph F. Peters, Jr.
Assistant Examiner—Terrance L. Siemens
Attorney, Agent, or Firm—Silverman & Cass, Ltd.

[57] ABSTRACT

A bicycle fairing comprising a unitary molded body carrying a transparent windshield, brace means for securing said fairing body to the handlebars of a bicycle and a bracket which enables securement of the body of the fairing to the fork holder of the bicycle and positions the fairing properly relative to the bicycle to enable proper securement of the brace means thereto. The bracket comprises a planar mid-portion and a pair of end bends, respectively extending in opposed directions but in parallel planes. The single bracket receives the fork holder of the bicycle through a passage formed in one end bend so that the coupling means which secures the fork holder to the bicycle frame can be used to complete the assembly of fairing body to the bicycle. The length of the mid-portion of the bracket is selected to enable coupling of the fairing to a bicycle or to the so-called "hi-rise" model by 180° rotation of the bracket about its axis. The opposite bend is provided with suitable passageways capable of matching with similar passageways formed in the fairing to enable passage of fastening means therethrough.

5 Claims, 6 Drawing Figures

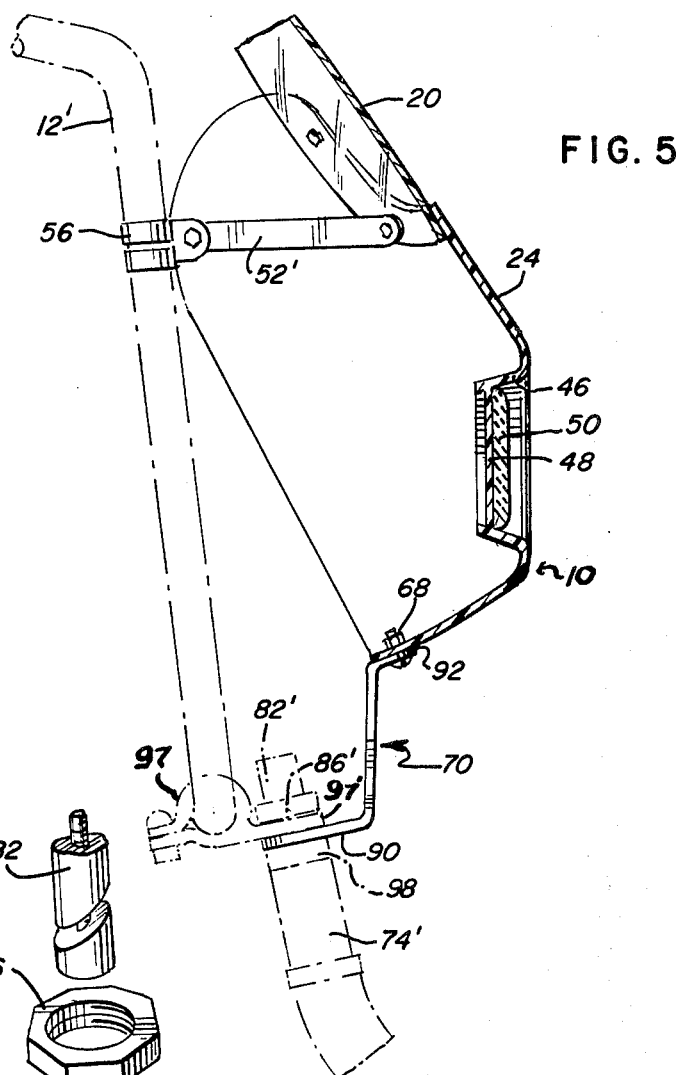
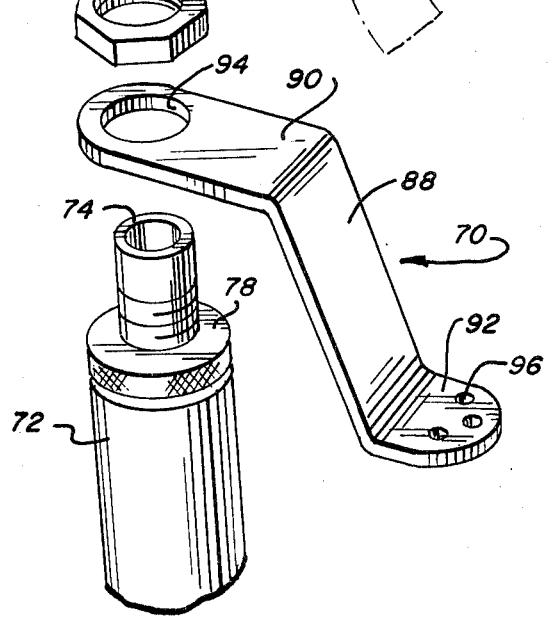
FIG. 5
FIG. 6

BICYCLE FAIRING AND BRACKET THEREFOR

BACKGROUND OF THE INVENTION

This invention relates generally to fairings as used conventionally on motorcycles. More particularly, fairing is provided for bicycles for reducing wind resistance, said fairing being provided with a single bracket for installation of the fairing on one or the other of the two most popular bicycle styles, that is, a conventional or regular and the so-called "hi-rise" models.

A fairing is a smooth lined structure used to reduce wind drag, as in aircraft. Fairings utilized on motorcycles have been particularly useful and popular. To the best of my knowledge, such structures have not been designed as yet for use on bicycles. Little success has been encountered in adapting fairings used on motorcycles to the bicycle. One major difficulty has been the design of a fairing intended for use in low speeds attainable with bicycle operation compared to relatively high speed motorcycle operation. Difficulties have been encountered in establishing a stable yet inexpensive mounting of the fairing to a bicycle. Different types of bicycle is likely to require different structures, both of fairing and mounting means. Stability is an expected problem.

A need has arisen to provide a fairing that is capable of mounting to and for use with a bicycle, which is universal in nature, particularly as concerns the two most popular bicycle constructions.

SUMMARY OF THE INVENTION

A fairing for bicycles comprising a unitarily molded body portion including a nose, a bottom deck, a pair of outwardly flaring rearwardly extending wings, the wings each having portions carrying a 90° radius of curvature, brace means secured to said wing portions and extending rearwardly thereof, said brace means having couplings capable of being secured to the handlebars of the bicycle. A bracket is provided, one end of which carries a passage capable of accommodating the standard fork holder of the bicycle and the opposite end capable of securement to the bottom deck of the fairings. The bracket is a flat member having a pair of opposite end portions bent in opposite directions at the same acute angle relative to the flat member, the end portions being parallel planes, one relative to the other.

DESCRIPTION OF THE DRAWINGS

FIG. 5 is a side elevational fragmentary view of the fairing of the invention as installed on a hi-rise type bicycle.

FIG. 6 is an exploded fragmentary detail illustrating the assembly of the fairing bracket to the bicycle of FIG. 1.

DESCRIPTION OF PREFERRED EMBODIMENT

Figure 1:
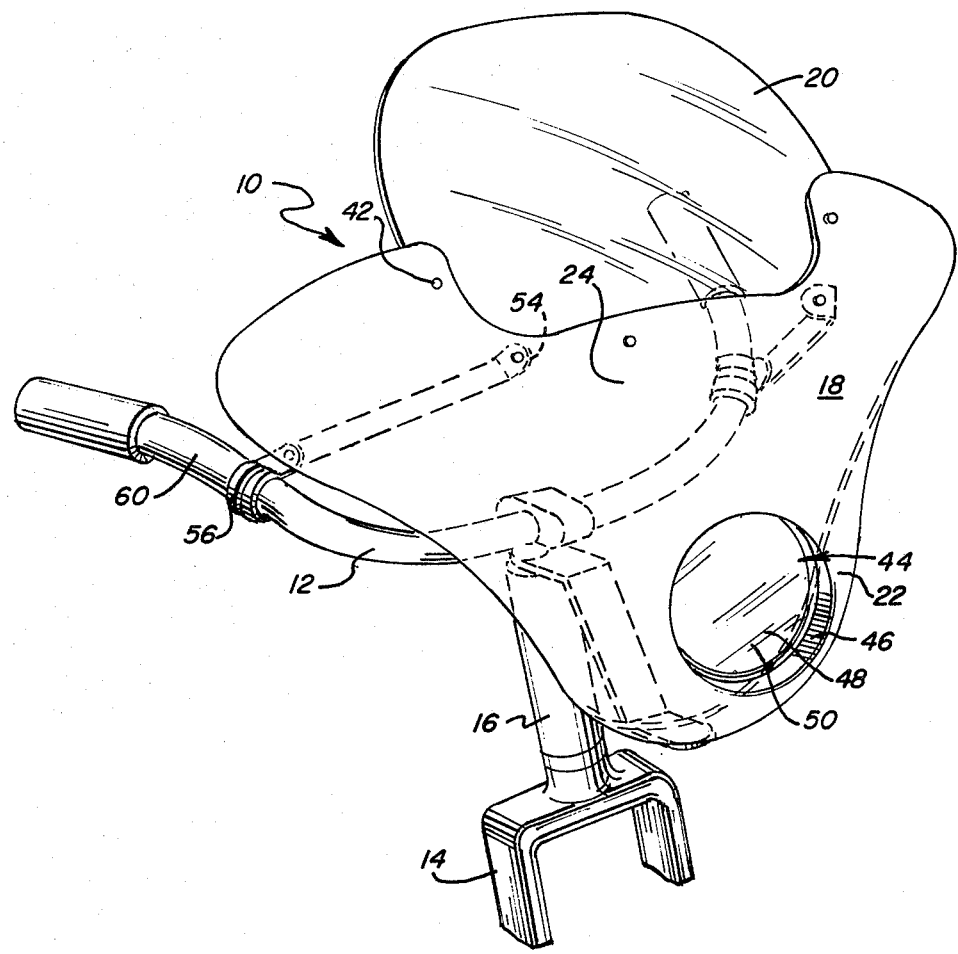
FIG. 1 is a front fragmentary perspective view of a conventional type bicycle illustrating the fairing of the invention installed thereupon.
Figure 2:
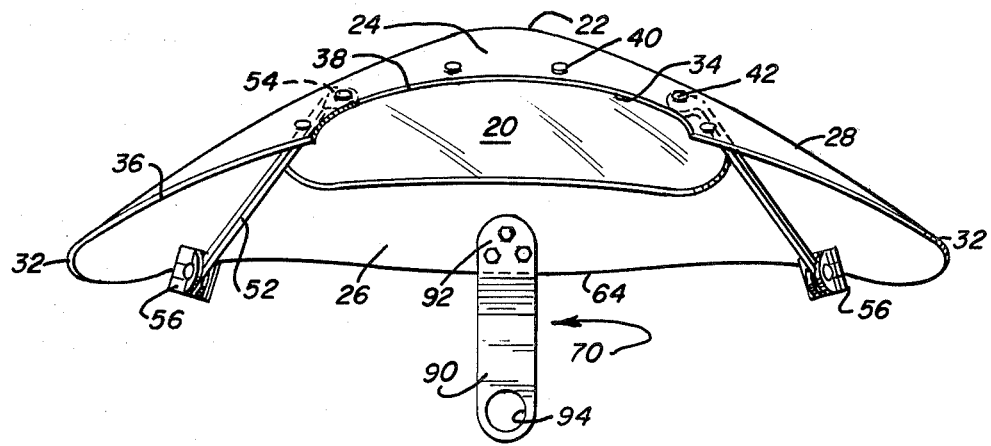
FIG. 2 is a top plan view of the fairing illustrated in FIG. 1.

Referring to the drawings, the fairing 10 constructed in accordance with the invention is illustrated as secured upon a conventional bicycle. Since the bicycle per se forms no part of the invention, the only portion illustrated herein includes the handlebars 12, the fork 14 and the fork-holder 16 to which the fairing is secured.

The fairing 10 is formed of a unitary molded body 18 to which a transparent windshield 20 is fastened. The body 18 is molded preferably of flexible polypropylene by conventional injection molding techniques. The windshield 2 preferably is fabricated of vacuum formed butyrate. The molded body 18 includes a nose portion 22, a top portion 24, a deck floor portion 26 and a pair of connecting wing portions 28 each of which includes a curved area 30, the configuration of which has a 90° curvature inward of the body. The wings also include rearward extending terminal extention portions 32. A neck like opening 34 is defined by the inner edges 36 of the wings and extensions 32 and the rear edge 38 of top portion 24. A row of apertures 40 are formed in the body 18 adjacent said neck opening 34. Fastenings, such as acorn nuts 42, are fitted in said apertures 40 and used to fasten the transparent windshield 20 to the fairing 20 along edges 36 and 38.

A dish-shaped recess 44 is formed in the nose 22 and includes bottom wall 48 and a circumferential wall portion 46. A reflector 50 may be seated frictionally in the recess 44. The bottom wall 48 may be connected to the recess wall 46 by a thin web so that, if desired, the wall 48 may be knocked out to accommodate a headlamp housing (not shown).

Each of braces comprises a flat bar having an end tab 54 and circular ring clamp 56 located at the opposite end. End tab 54 carries an aperture for accommodating a screw or bolt 58. Ring clamp 56 is capable of encircling the handlebar portion 60 and thereafter tightened.

Three openings 62 are provided in the floor 26 of the fairing 10 near the edge 64 thereof. Openings 62 accommodate fastening means such as bolts 68 for fastening a bracket 70 thereto.

Installation of the fairing 10 is completed using bracket 70. With reference to FIG. 6, the fork holder 16 of the bicycle includes a vertical hollow standard 72 having a narrow diameter end 74. A circumferentially knurled washer 76 seats on the annular rim 78. End 74 carries exterior threads 80. The handlebar 12 has a depending bar 82 which carries threaded rod 84. The bar 82 passes through nut 86 and is received in the hollow bore 88 of standard 72. The threaded rod 84 is manipulated to expand the lower portion of bar 82 to position the handlebar 12 at a desired height relative to the bicycle frame. The nut 86 then is tightened upon the outer thread 80 of end 74. This is conventional for both popular types of bicycles, with the difference between conventional models and the high-rise being the length of the standard 72, the ensuing relocation relative to the fork of the rim 78 and the angle at which the handlebars are formed, and directed.

Figures 3, 4:
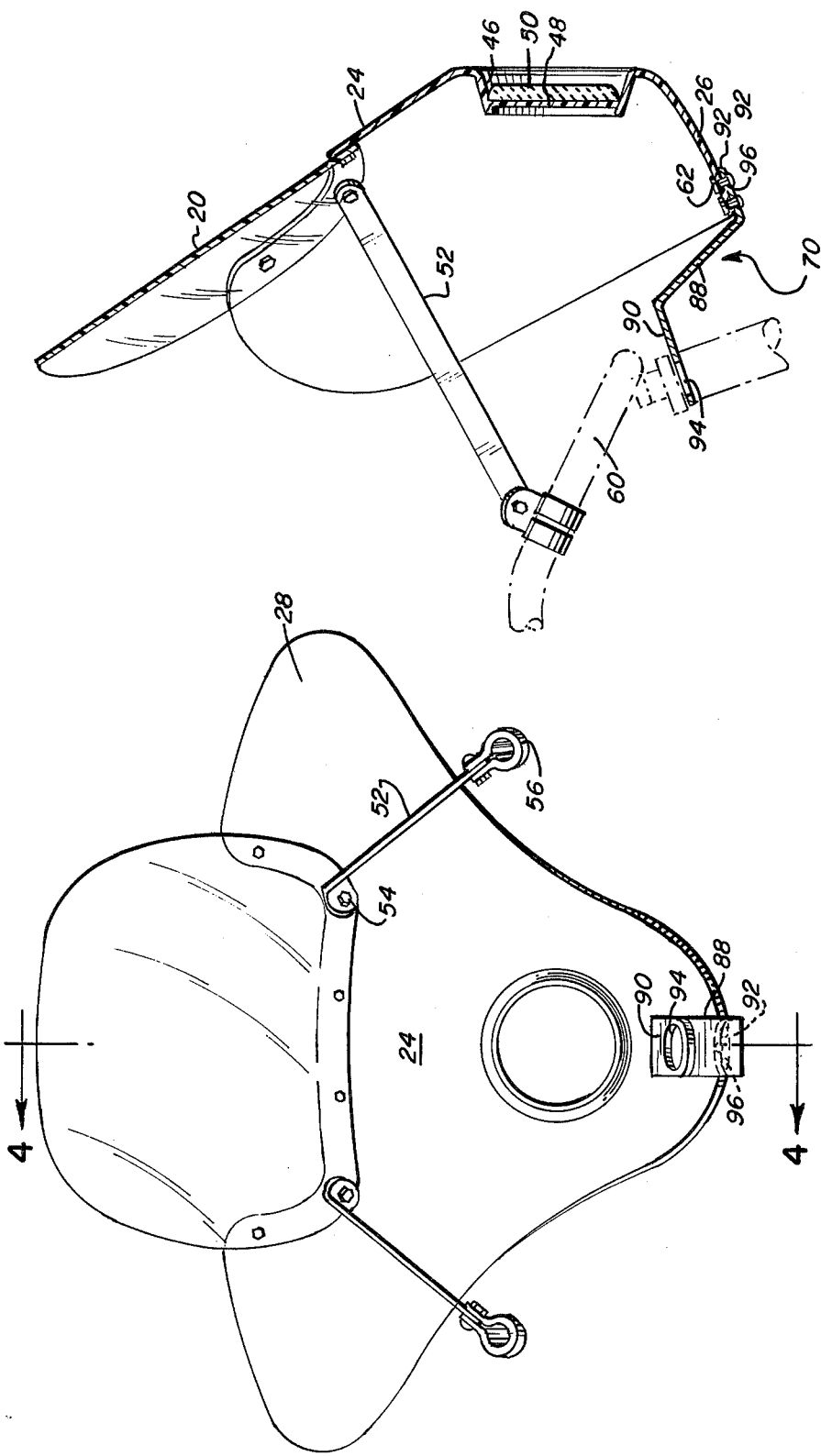
FIG. 3 is a rear view of the fairing illustrated in FIG. 1.
FIG. 4 is a side elevational view of the fairing of FIGS. 1-3.

The bracket 70 is formed of a single length of metal, preferably 14 guage steel, formed to comprise a mid-portion 88 and a pair of end portions 90 and 92. End portion 90 is bent at an acute angle in one direction while end portion 92 is bent at the same angle but in the opposite direction. Portion 90 carries passage 94 while portion 92 has apertures 96 formed therein the the same relationship one to the others as the openings 62 formed in the deck 26 of the fairing 10. The dimensions of the bracket 70 and particularly the length of mid-portion 88 are selected to comply with the standardized dimensional differences between the conventional bicycle such as illustrated in FIG. 1, and the "hi-rise" model bicycle illustrated in FIG. 5. This is represented by the solid line representation of the orientation of the bracket 70 in FIG. 4 in respect of a conventional bicycle and the phantom line representation of the orientation of the bracket 70 to enable installation of the fairing 10 on the hi-rise model bicycle.

In order to install the fairing on the bicycle frame, one merely disassembles the coupling between the bar portion 82 depending from handlebar 12 and the fork holder 16 of the bicycle. The bracket 70, is secured to the fairing 10 by aligning openings 62 and 96 and passing suitable fasteners therethrough. The bracket portion 90 is slipped over the rod end 74 and the standard 72 is slipped through the passageway 94. The bracket portion 90 seats on the annular rim 78. The assembly of bar 82 and standard 72 is effected, with the bracket 70 sandwiched between the annular rim 78 and the nut 86.

The fairing 10 is illustrated in FIG. 5 as mounted on a bicycle of the hi-rise type. The frame of the bicycle includes a bar 82' and is connected to the handlebars 12 by a clamp 97, including ring 97' which ordinarily slips over the bar 82' and is firmed by manipulation of nut 86'. To install the fairing 10, the bracket 70 is rotated 180° from its orientation during use upon a conventional bicycle, the nut 86' and clamp ring 97' removed, and the portion 90 of the bracket 70 is seated on ring 98 (which slips over end 74' of fork holder 16'. Ring 97' is replaced as well as nut 86' and the nut 86' is firmed on the bar 82'.

The braces 52' used in respect of the hi-rise bicycle, are each lesser in length than braces 52, that being the only difference between means used to install the fairing 10 upon conventional bicycles and the means used to install same upon the hi-rise type. One will note that the hi-rise bicycle differs from the conventional bicycle particularly in the length and conformation of the handlebars and the different connection of the handlebars to the frame. Of course, the seat, frame, etc are different but have no bearing upon the installation of the fairing.

What I claim is:

1. A bicycle fairing for a bicycle having a frame, handlebar, fork holder and releasable coupling securing the handlebar to the fork holder, the fairing comprising a unitary body of dish-shaped configuration including a nose, a floor extending rearwardly from the nose, a curved top extending rearwardly but upwardly from the nose and a pair of curved wings, side portions joining said floor and wings, each side portion including an area having a 90° inward curvature, a transparent shield secured to said body between the wings, brace means secured to said wings and extending rearwardly thereof on opposite sides of said shield, clamp means carried by said brace means for coupling same to the handlebar and a bracket capable of securing the fairing to the fork holder, said bracket being rotable 180° about its axis whereby to enable assembly of said fairing to one or the other of the conventional and hi-rise bicycles.

2. The invention as claimed in claim 1 in which said bracket comprises a planar member having a pair of opposite angular end bends, said bends respectively extending in opposite directions.

3. The invention as claimed in claim 2 in which the bracket has a first passageway formed in one bend and a second passageway formed in the opposite bend, means formed in the fairing floor cooperating with said second passageways when the fork holder is accommodated through said first passageway for receiving fastening means.

4. The invention as claimed in claim 3 in which the length of the planar mid-portion of said bracket between said bends is selected to be one-half the distance between the fork holder and the handlebar coupling assembly.

5. A bicycle fairing comprising a unitary molded shield of generally triangular configuration having a forward nose portion, a pair of rearwardy extending curved wing portions flaring rearwardly and outwardly of said nose portion, a transparent windscreen and means for securing said windscreen to the shield between the wings, brace means secured to said shield along the juncture between said windscreen and said shield and an attachment bracket, the brace means adapated to be secured to the handlebars of a bicycle and the attachment bracket capable of being secured to the fork holder of the bicycle, said attachment bracket comprising a flat member having a pair of end bend portions, one end portion having a passage of size and configuration to receive the fork holder therethrough and the opposite end portion having means for securing said shield thereto, the end portions being in parallel planes and having the same angular relationship with said flat member but directed in opposite directions, said bracket enabling installation of the fairing on conventional and hi-rise bicycles with only a 180° rotation of the bracket about its axis.

* * * * *